(12) United States Patent
Iyer et al.

(10) Patent No.: US 9,243,152 B2
(45) Date of Patent: Jan. 26, 2016

(54) EPOXY-CONTAINING POLYSILOXANE OLIGOMER COMPOSITIONS, PROCESS FOR MAKING SAME AND USES THEREOF

(71) Applicant: Momentive Performance Materials Inc., Waterford, NY (US)

(72) Inventors: Narayana Padmanabha Iyer, Bangalore (IN); Lesley Hwang, Chappaqua, NY (US); Vikram Kumar, Tarrytown, NY (US); Christian Geismann, Bergisch Gladbach (DE); Constantine Kondos, White Plains, NY (US); Shiu-Chin Su, Croton-on-Hudson, NY (US)

(73) Assignee: Momentive Performance Materials Inc., Waterford, NY (US)

( * ) Notice: Subject to any disclaimer, the term of this patent is extended or adjusted under 35 U.S.C. 154(b) by 59 days.

(21) Appl. No.: 14/247,645

(22) Filed: Apr. 8, 2014

(65) Prior Publication Data

US 2014/0221531 A1    Aug. 7, 2014

Related U.S. Application Data

(62) Division of application No. 13/329,430, filed on Dec. 19, 2011, now Pat. No. 8,728,345.

(51) Int. Cl.
| | |
|---|---|
| *C09D 7/12* | (2006.01) |
| *C09D 183/06* | (2006.01) |
| *C08G 77/14* | (2006.01) |
| *C09J 183/06* | (2006.01) |

(52) U.S. Cl.
CPC .............. *C09D 7/1233* (2013.01); *C08G 77/14* (2013.01); *C09D 183/06* (2013.01); *C09J 183/06* (2013.01)

(58) Field of Classification Search
CPC .... C09D 7/1233; C09D 183/06; C08G 77/14; C09J 183/06
See application file for complete search history.

(56) References Cited

U.S. PATENT DOCUMENTS

| | | |
|---|---|---|
| 7,595,372 B2 | 9/2009 | Lejeune et al. |
| 7,732,552 B2 | 6/2010 | Lejeune et al. |
| 7,893,183 B2 | 2/2011 | Lejeune et al. |
| 2007/0179268 A1 | 8/2007 | Lejeune et al. |
| 2010/0191001 A1 | 7/2010 | Wassmer et al. |

FOREIGN PATENT DOCUMENTS

| | | |
|---|---|---|
| DE | 10 2007 038313 A1 | 2/2009 |
| DE | 10 2007 038314 A1 | 4/2009 |
| DE | 10 2011 111757 A1 | 2/2013 |

OTHER PUBLICATIONS

"Quantitative mass spectrometry of technical polymers; a comparison of several ionization methods", W. Yan, et al., Eur. Mass Spectrom. 4, 467-474 (1998).
"Epoxysilane Oligomer for Protective Coatings", C.A. Byrne, A.N. Kumar et al., Momentive Performance Materials, XP-002696044, pp. 1-12, (2011).
International Search Report and Written Opinion dated May 17, 2014.

*Primary Examiner* — Robert S Loewe

(74) *Attorney, Agent, or Firm* — James C. Abruzzo

(57) ABSTRACT

The present invention relates to stable, zero or low VOC epoxy-containing polysiloxane oligomer compositions that provide for a high degree of chemical resistance to compositions containing organic resins, while at the same time, maintaining or improving the flexibility of these organic resin-containing compositions, to processes for preparing epoxy-containing polysiloxane oligomer compositions, and to uses in coatings, sealants, adhesives, and composites containing the same.

18 Claims, 3 Drawing Sheets

EPOXY-CONTAINING POLYSILOXANE OLIGOMER COMPOSITIONS, PROCESS FOR MAKING SAME AND USES THEREOF

CROSS REFERENCE TO RELATED APPLICATIONS

The present application is a divisional of U.S. application Ser. No. 13/329,430 filed Dec. 19, 2011, to which priority is claimed.

FIELD OF THE INVENTION

The present invention relates to epoxy-containing polysiloxane oligomer compositions, process of preparation, and uses thereof.

BACKGROUND OF THE INVENTION

The use of monomeric epoxy-functional silanes in coating, adhesive, sealant and composite applications is known. Recently, oligomeric epoxy-functional silanes were disclosed as an important component of waterborne coatings. For example, U.S. Pat. Nos. 7,732,552 and 7,893,183 disclose water-based coating compositions containing oligomeric epoxy-functional silanes and one or more optional ingredients such as surfactants, pH adjusting agents, co-solvents, monomeric silanes, binders, crosslinkers and pigment paste dispersions. These oligomeric epoxy-functional silanes are prepared from glycidoxy silane and/or cycloaliphatic epoxy silane having 2 or 3 alkoxy groups and less than 1.5 equivalents of water in the presence of a catalyst, wherein the water is continuously fed during the reaction.

Oligomeric epoxy-functional silanes can also be prepared by other methods. For example, U.S. Patent Application Publication No. 2010/0191001 discloses oligomeric epoxy-functional silanes prepared by using 0.001 to less than 5 mol of water per mole of alkoxy function of silanes and not using any further hydrolysis or condensation catalyst apart from boric acid as a hydrolysis catalyst and condensation component.

Unfortunately, although the use of oligomeric epoxy-functional silanes in the coating compositions may improve the chemical resistance of the coatings, the flexibility of the coatings may be compromised due to the higher degree of crosslinking associated with the use of high molecular weight oligomeric epoxy-functional silanes. Further, the volatile organic compound (VOCs) emissions in the form of alcohols from coatings containing the low molecular weight epoxy-functional silane oligomers disclosed in the prior art may be high due to partial hydrolysis of the monomeric epoxy-functional alkoxysilane.

Accordingly, there is a continuing need in the coatings industry for a stable, zero or low VOC containing epoxy-containing polysiloxane oligomer composition that improves the chemical resistance of the coatings while at the same time, maintains or improves the flexibility of the coating containing this epoxy-containing polysiloxane oligomer composition. The present invention provides an answer to that need.

SUMMARY OF THE INVENTION

In one aspect, the present invention is directed to an epoxy-containing polysiloxane oligomer composition comprising:

(i) from 5 to 65 mole percent of a polysiloxane of the Formula (I):

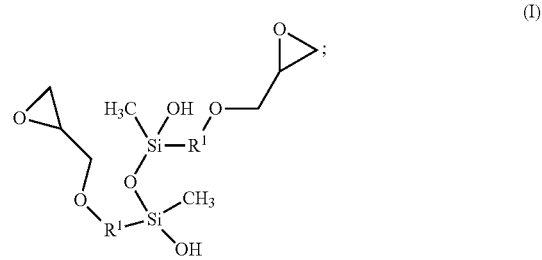

(ii) from 10 to 55 mole percent of a polysiloxane of the Formula (II):

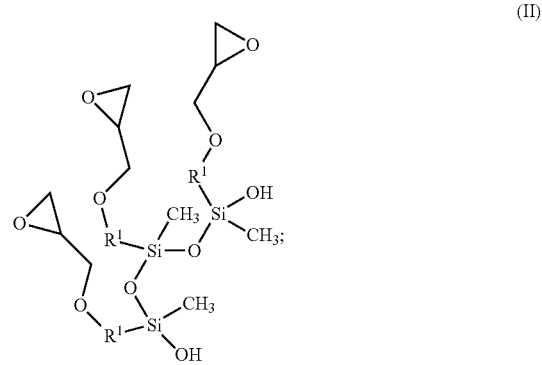

(iii) from 5 to 45 mole percent of a polysiloxane of the Formula (III):

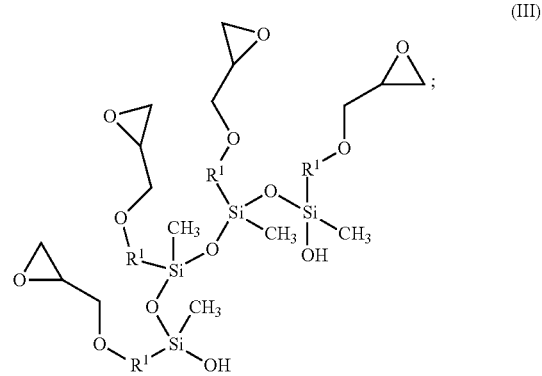

(iv) from 1 to 20 mole percent of a polysiloxane of the Formula (IV):

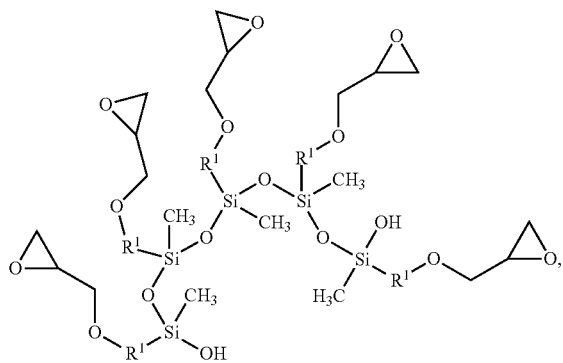

and (v) from 0.1 to 20 mole percent of a polysiloxane of the Formula (V):

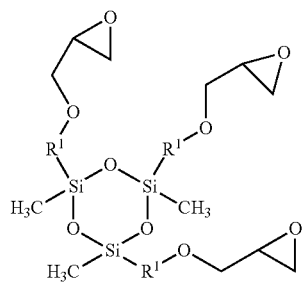

wherein each occurrence of $R^1$ is —$CH_2CH_2CH_2$— and the mole percent of components (i), (ii), (iii), (iv) and (v) are based upon the sum of the molar amounts of components (i), (ii), (iii), (iv) and (v).

In another embodiment, the epoxy-containing composition of the present invention further comprises a stabilizing agent.

The epoxy-containing polysiloxane oligomer composition of the invention can be prepared by a process comprising:

(a) hydrolyzing a silane of the general Formula (VI):

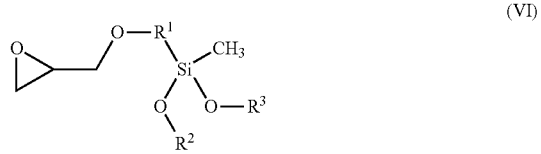

wherein:
$R^1$ is —$CH_2CH_2CH_2$—;
$R^2$ is a monovalent alkyl group of from 1 to 3 carbon atoms; and
$R^3$ is a monovalent alkyl group of from 1 to 3 carbon atoms;
in the presence of 2 to 15 moles of water per mole of the silane and, optionally, a hydrolysis catalyst, at a temperature of from 10° to 100° C. to provide an intermediate containing a silanol and an alcohol;

(b) removing the alcohol by distillation;

(c) removing water to condense the silanol to provide an epoxy-containing polysiloxane oligomer composition comprising from 5 to 65 mole percent of the polysiloxane of the Formula (I), from 10 to 55 mole percent of the polysiloxane of the Formula (II), from 5 to 45 mole percent of the polysiloxane of the Formula (III), from 1 to 20 mole percent of the polysiloxane of the Formula (IV), and from 0.1 to 20 mole percent of polysiloxane of Formula (V), wherein the Formulae (I), (II), (III), (IV) and (V) are as defined above, wherein the mole percents of components (i), (ii), (iii), (iv) and (v) are based upon the sum of the molar amounts of components (i), (ii), (iii), (iv) and (v); and optionally (d) adding a stabilizing agent.

In another aspect, the present invention relates to a composition comprising:

(i) the epoxy-containing polysiloxane oligomer composition as described above;

(ii) an organic resin containing at least one functional group selected from the group consisting of epoxy, carboxylic acid, carboxylate anion, amino, ureido, urethane, mercapto, hydroxyl, alkoxysilyl and isocyaynato; and (iii) at least one additional component selected from the group consisting of a solvent, surfactant, particulate metal, pigment, biocide, filler, thixotrope, catalyst, curing agent, pH adjusting agent and leveling agent.

These and other aspects will become apparent upon reading the following description of the invention.

DETAILED DESCRIPTION OF THE INVENTION

Figure 1:
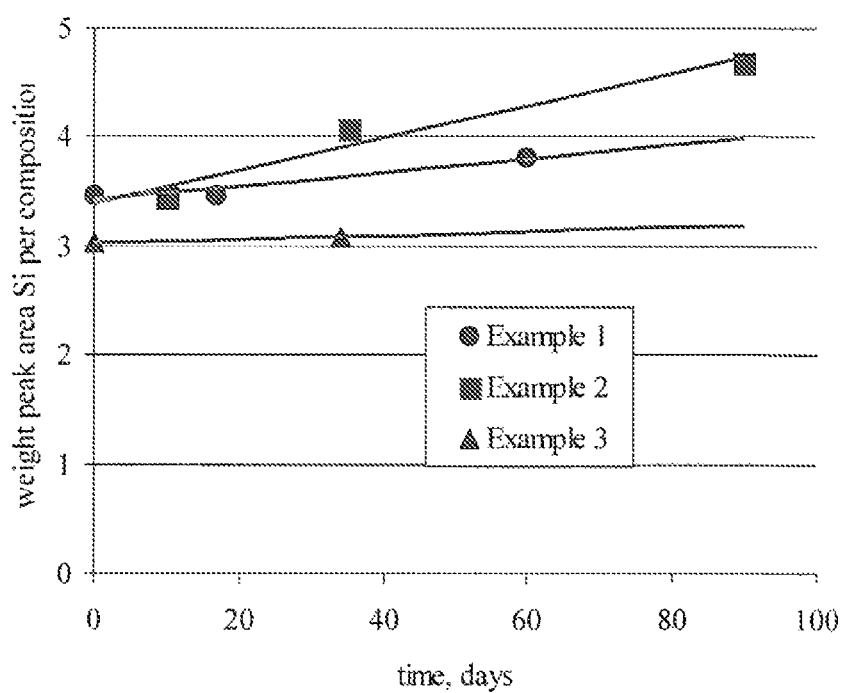
FIG. 1 illustrates the effect of using a stabilizing agent to improve the stability of the epoxy-containing polysiloxane oligomer composition.

It has been surprisingly found that the epoxy-containing polysiloxane oligomer composition of the invention provides a high degree of chemical resistance to coatings, and at the same time, maintains or improves the flexibility of the coatings. In addition, the epoxy-containing polysiloxane oligomer compositions of the invention impart very low or zero VOCs in the form of alcohols to the coating formulations.

Advantageously, in one embodiment, the epoxy-containing polysiloxane oligomer composition of the invention comprises:

(i) from 5 to 65 mole percent, more specifically from 9 to 30 mole percent, and even more specifically from 10 to 20 mole percent of a polysiloxane of the Formula (I):

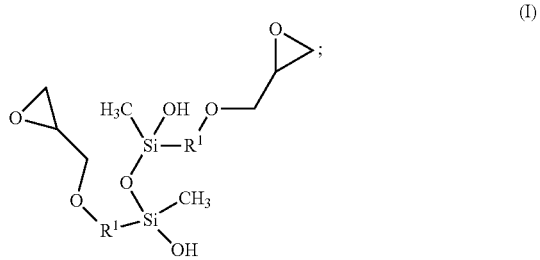

(ii) from 10 to 55 mole percent, more specifically from 30 to 50 mole percent, and even more specifically from 35 to 48 mole percent of a polysiloxane of the Formula (II):

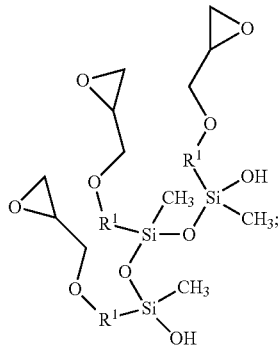

(iii) from 5 to 45 mole percent, more specifically from 20 to 40 mole percent, and even more specifically from 25 to 35 mole percent of a polysiloxane of the Formula (III):

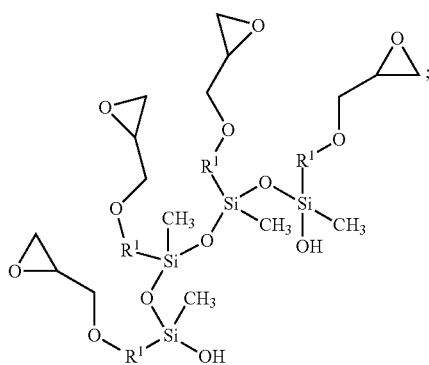

(iv) from 1 to 20 mole percent, more specifically from 5 to 18 mole percent and even more specifically from 7 to 15 mole percent of a polysiloxane of the Formula (IV):

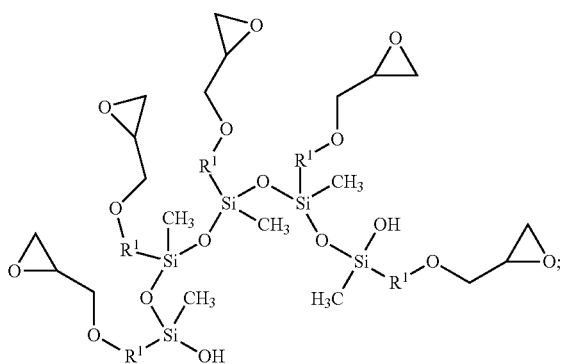

(v) from 0.1 to 20 mole percent, more specifically from 2 to 8 mole percent, and even more specifically from 3 to 6 mole percent of a polysiloxane of the Formula (V):

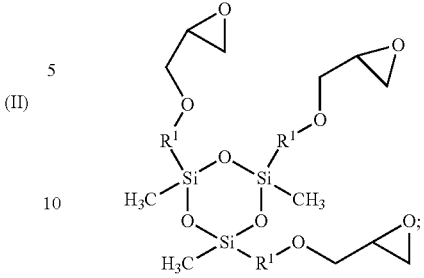

wherein $R^1$ is —$CH_2CH_2CH_2$— and the mole percent of components (i), (ii), (iii), (iv) and (v) are based upon the sum of the molar amounts of components (i), (ii), (iii), (iv) and (v).

In another embodiment, the composition of the epoxy-containing polysiloxane oligomer composition comprises from 5 to 65 peak area percent, more specifically from 9 to 30 peak area percent, and even more specifically from 10 to 20 peak area percent of component (i); from 10 to 55 peak area percent, more specifically from 30 to 50 peak area percent, and even more specifically from 35 to 48 peak area percent of the component (ii); from 5 to 45 peak area percent, more specifically from 20 to 40 peak area percent, and even more specifically from 25 to 35 peak area percent of component (iii); from 1 to 20 peak area percent, more specifically from 5 to 18 peak area percent and even more specifically from 7 to 15 peak area percent of component (iv); and from 0.1 to 20 peak area percent, more specifically from 2 to 8 peak area percent, and even more specifically from 3 to 6 peak percent of component (v), wherein the peak area percent of components (i), (ii), (iii), (iv) and (v) are based upon the sum of the peak areas as determined by the liquid chromatographic-mass spectrometric method (LC-MS Method) of components (i), (ii), (iii), (iv) and (v), as described herein.

In still another embodiment, the epoxy-containing composition has a viscosity of from 50 centistokes to 250 centistokes and more specifically from 100 centistokes to 200 centistokes at 20° C. using a bubble viscometer and carried out in accordance with ASTM method D-1545.

In another embodiment, the epoxy content is from 5.2 milliequivalents per gram to 5.7 milliequivalents per gram and more specifically, from 5.3 milliequivalents per gram to 5.6 milliequivalents per gram, as determined by a titration method involving the reaction of the epoxy-containing polysiloxane oligomer composition with hexadecyltrimethylammonium bromide in acetic acid and titrating the acetate anion with perchloric acid.

In yet another embodiment, the amount of releasable alcohol generated from the reaction of the epoxy-containing polysiloxane oligomer compositions with water is less than 1 weight percent, more specifically less than 0.5 weight percent, and even more specifically, less than 0.2 weight percent, based upon the sum of the weights of components (i), (ii), (iii), (iv) and (v). In one embodiment, the weight percent releasable alcohol is calculated using an 13-C NMR method in which the relative molar amount of the alkoxysilyl carbon SiOC is used to calculate the weight of alcohol by multiplying the relative molar amount of the alkoxysilyl carbon SiOC by the molecular weight of the alcohol, and the molar amount of the methylsilyl carbon $SiCH_3$ is used to calculate the sum of the weights of components (i), (ii), (iii), (iv) and (v) by multiplying the relative molar amounts of the methylsilyl carbon $SiCH_3$ by 162, and the weight percent releasable alcohol is calculated by dividing the weight of alcohol by the weight of components (i), (ii), (iii), (iv) and (v) and multiplying the quotient by 100%.

In still yet another embodiment, the epoxy-containing composition of the invention comprises less than 10 mole percent, more specifically, less than 5 mole percent, and even more specifically, less than 3 mole percent, of epoxy-containing polysiloxane oligomer components having 6 or more silicon atoms, based upon the sum of the molar amounts of components (i), (ii), (iii), (iv) and (v). In yet still another embodiment, the number average molecular weight of the epoxy-containing polysiloxane oligomer composition is between 500 grams per mole and 700 grams per mole, as determined by a GPC method using polystyrene standards, as described herein.

The epoxy-containing polysiloxane oligomer composition of the invention can be prepared by a process including the step of hydrolyzing a silane of Formula (VI):

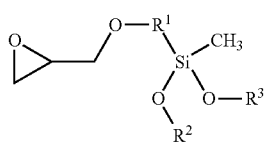

(VI)

to form a silanol, removing byproduct alcohols, and condensing the silanol by removing water, wherein:

$R^1$ is —$CH_2CH_2CH_2$—;

$R^2$ is a monovalent alkyl group of from 1 to 3 carbon atoms; and $R^3$ is a monovalent alkyl group of from 1 to 3 carbon atoms.

Advantageously, $R^2$ and $R^3$ are independently a methyl or ethyl group.

Specifically, the process of the invention comprises the steps of:

(a) hydrolyzing a silane of the general Formula (VI) in the presence of 2 to 15 moles of water per mole of the silane and, optionally, a hydrolysis catalyst, at a temperature of from 10° to 100° C. to provide an intermediate containing a silanol and an alcohol;

(b) removing the alcohol by distillation;

(c) removing water to condense the silanol to the desired polysiloxane oligomer composition comprising from 5 to 65 mole percent, more specifically from 9 to 30 mole percent, and even more specifically from 10 to 20 mole percent of the polysiloxane of the Formula (I), from 10 to 55 mole percent, more specifically from 30 to 50 mole percent, and even more specifically from 35 to 48 mole percent of the polysiloxane of the Formula (II), from 5 to 45 mole percent, more specifically from 20 to 40 mole percent, and even more specifically from 25 to 35 mole percent of the polysiloxane of the Formula (III), from 1 to 20 mole percent, more specifically from 5 to 18 mole percent and even more specifically from 7 to 15 mole percent of the polysiloxane of the Formula (IV), and from 0.1 to 20 mole percent, more specifically from 2 to 8 mole percent, and even more specifically from 3 to 6 mole percent of the polysiloxane of the Formula (V), wherein the Formulae (I), (II), (III), (IV) and (V) are as defined above, wherein the mole percents of components (i), (ii), (iii), (iv) and (v) are based upon the sum of the molar amounts of components (i), (ii), (iii), (iv) and (v); and optionally (d) adding a stabilizing agent, thereby making the polysiloxane oligomer composition of the invention.

In the mixing step (a), the silane of Formula (VI) is hydrolyzed in the presence of 2 to 15 moles of water per mole of the silane, specifically 4 to 10 mole of water per moles of the silane, more specifically 5 to 7 moles of water per mole of the silane, and optionally in the presence of a catalyst.

The catalyst can be metal salts, alkyl ammonium salts, ion exchange resins, carboxylic acids, mineral acids or metal chelates. Preferably, the catalysts are poor nucleophiles that do not readily react with the glycidoxy group of the silane and are poor catalysts for the condensation of the silanol intermediate of step (a). These preferred catalysts include carboxylic acids having a $pK_a$ value of from 2 to 5, and more preferably from 3.5 to 4.8. Representative and non-limiting examples of the catalysts include formic acid, acetic acid, propanoic acid, 1-butanoic acid, and tartaric acid. The acid catalyst can be used at amounts ranging from 1 part per million (ppm) to 1 weight percent based upon the weight of the silane of Formula VI, more specifically from 5 ppm to 1.000 ppm and even more specifically from 50 ppm to 500 ppm.

The hydrolysis temperature of step (a) is from 10° C. to 100° C., more specifically, from 15° C. to 50° C., and even more specifically from 20° C. to 35° C. The hydrolysis of step (a) may be conducted under sub atmospheric, atmospheric or super atmospheric pressure. The hydrolysis pressure of step (a) is from 0.01 kilopascal to 200 kilopascal, and more specifically from 80 kilopascal to 110 kilopascal. The hydrolysis time may vary from 1 minute to 200 hours, more specifically from 1 hour to 100 hours and even more specifically from 16 hours to 96 hours.

The alcohol byproducts can be removed by distillation. In one embodiment, the removal of the alcohol from step (b) is carried out by distillation at a pressure of from 0.01 kilopascal to 200 kilopascal, more specifically from 0.1 kilopascal to 110 kilopascal, and even more specifically from 2 kilopascal to 105 kilopascal. The temperature for the distillation can range from 10° C. to 100° C., more specifically from 20° C. to 80° C., and even more specifically, from 25° C. to 60° C.

The removal of the water and condensation of the silanol of step (c) can be accomplished by distillation. In one embodiment, the removal of the water and condensation of the silanol of step (c) is carried out by distillation at a pressure of from 0.01 kilopascal to 200 kilopascal, more specifically from 0.1 kilopascal to 110 kilopascal, and even more specifically from 2 kilopascal to 105 kilopascal. The temperature for the distillation can range from 10° C. to 100° C., more specifically from 20° C. to 80° C., and even more specifically, from 40° C. to 75° C. The time to achieve the condensation can vary depending upon the temperature and pressure used. Typically, the removal of water and condensation of the silanol of step (c) requires from 1 hour to 200 hours, more specifically from 2 hours to 24 hours and even more specifically from 3 hours to 16 hours. The removal of the water and condensation of the silanols can be assisted by sparging the reaction mixture of step (c) with an inert gas, such as for example nitrogen.

In one embodiment, the amount of water to be removed in step (c) can be calculated from the equation:

$$W_{wd} = 18.02 M_{sa}[M_{wa} - M_{wr} - 0.235x]$$

wherein:

$W_{wd}$=amount of water removed in step (c) in grams;

$M_{wa}$=number of moles of water added in step (a) per mole of silane;

$M_{sa}$=number of moles of silane added in step (a);

$M_{wr}$=number of moles of water reacted per mole of silanes:

x=1 if byproduct alcohol is ethanol, and x=0 if byproduct alcohol is methanol, propanol or isopropanol.

The value of $M_{wr}$ is from 1.25 moles water per mole silane to 1.45 moles water per mole silane.

When the alcohol removed in step (b) forms an azeotrope with water, such as in the case of ethanol, then for each mole of silane initially added in step (a), 0.235 moles of water is removed in step (c) due to the water:ethanol azetrope. The water:ethanol azeotrope is 4.4 weight percent water and 95.6 weight percent ethanol, or 0.117 moles water per mole ethanol. If the alcohol does not form an azeotrope with water, then the value of 0.235(x) is zero.

In one embodiment, the process is carried out in which in step (a) the silane is 3-glycidoxypropylmethyldimethoxysilane or 3-glycidoxypropylmethyldiethoxysilane and the amount of water is 5 to 7 mole per mole of silane; the hydrolysis is carried out at a temperature of from 20° C. to 30° C., a pressure of from 80 to 105 kilopascal, and a time ranging from 10 to 100 hours; removal of the alcohol of step (b) at a temperature of from 25° C. to 60° C., pressure of 2 to 105 kilopascal for 1 to 10 hours; removal of the water and condensation of the silanol of step (c) at a temperature of from 40° C. to 75° C., pressure of from 1 kilopascal to 15 kilopascal for a time of from 2 to 16 hours and wherein the amount of water removed per mole of silane is 62.1 grams water per mole silane to 104.5 grams water per mole silane.

Optionally, a stabilizing agent can be added in a step (d) to the epoxy-containing polysiloxane oligomer composition after water is removed. Suitable stabilizing agents are represented by Formula (VII):

$$R^4(OR^5)_p \quad \text{(VII)}$$

wherein:

$R^4$ is a boron atom, a HP(=O)(—)$_2$ group, a P(=O)(—)$_3$ group, a $R^6$C(=O)(—) group, a polyvalent hydrocarbon group containing from 3 to 20 carbon atoms or a polyvalent heterocarbon group containing from 3 to 20 carbon atoms;

each $R^5$ is independently a hydrogen, a $R^6$C(=O)(—) group, or a hydrocarbon containing from 1 to 6 carbon atoms;

each $R^6$ is independently a monovalent hydrocarbon group containing from 1 to 5 carbon atoms;

p is an integer of from 1 to 6. Specifically, $R^4$ is a boron atom or a divalent hydrocarbon group selected from the group consisting of alkylene, cycloalkylene, alkenylene, arylene and aralkylene containing from 4 to 12 carbon atoms. More specifically, $R^4$ is boron atom, P(=O)(—)$_3$ group, CH$_3$C(=O)(—) group, 2-methylpropylene, 1-methoxy-2,3-propylene, 1,2-hexylene, or 2,3-dimethyl-2,3-butylene; $R^5$ is hydrogen, CH$_3$C(=O)(—), methyl or ethyl; and p is 1, 2 or 3.

Representative, non-limiting examples of the stabilizing agent are boric acid, phosphoric acid, phosphorus acid, acetic acid, acetic acid anhydride, glycerol, 2-methyl-1,3-propanediol, 1-methoxy-2,3-propanediol, 1,2-hexanediol, and 2,3-dimethyl-2,3-butanediol.

The stabilization agent can be used at amounts ranging from 100 parts per million to 25 weight percent, based upon the sum of the weights of components (i), (ii), (iii), (iv), and (v). Specifically, the stabilizing agent can be used at 100 parts per million to 2 weight percent, based upon the sum of the weights of components (i), (ii), (iii), (iv), and (v), when $R^4$ is boron atom, HP(=O)(—)$_2$, P(=O)(—), or (CH$_3$)C(=O)(—), or from 1 to 25 weight percent, based upon the sum of the weights of components (i), (ii), (iii), (iv), and (v), when $R^4$ is a polyvalent hydrocarbon containing from 3 to 20 carbon atoms.

In one embodiment, the weight percents of components (i), (ii), (iii), (iv) and (v) are determined using a liquid chromatographic-mass spectrometric (LC-MS) method, which was adapted from the ESI Ionization Method disclosed in the reference, "Quantitative mass spectrometry of technical polymers: a comparison of several ionization methods", W. Yan, et al., Eur. Mass Spectrom. 4, 467-474 (1998). The method involves dissolving in acetonitrile the sample of the epoxy-containing polysiloxane at a concentration of 0.1 weight percent before analysis. The analysis is carried out with a Waters LCT Premier XE LC/MS instrument. An Atlantis dC18 (2.1× 30 mm, 3 um) column and the following gradient are used:

| Time (min) | % Water | % MeOH | % 2-propanol |
|---|---|---|---|
| 0.00 | 7 | 93 | 0 |
| 3.00 | 7 | 93 | 0 |
| 4.00 | 0 | 0 | 100 |
| 15.00 | 0 | 0 | 100 |
| 15.01 | 7 | 93 | 0 |
| 25.00 | 7 | 93 | 0 |

The flow rate is 0.3 ml/min, and the injection volume is 1.00 ml. The mass spectrometer is operated with the following settings:

Optics Mode: V
Ionization: ESi+
Capillary Voltage: 3000
Sample Cone Voltage: 50
Desolvation T (° C.) 300
Source T (° C.) 120
Nitrogen Gas Flow (L/hr.)
Cone: 50
Desolvation: 650
Mass Range: 100-2000

The peak area for each component (i) to (v) are divided by the sum of the peak areas for components (i), (ii), (iii), (iv) and (v) and the quotients are multiplied by 100%. The mole percent of the components can be calculated from the peak area percents, as determined by the liquid chromatographic-mass spectrometric (LC-MS) method described above and setting the response factor, which is the mole percent per peak area percent, for each of the components (i), (ii), (iii), (iv) and (v) equal to 1.

In still another embodiment, the number average molecular weight of the epoxy-containing polysiloxane oligomer composition is determined by a gel permeation chromatographic method (GPC). The GPC methods involves using a Waters 2690 Chromatograph equipped with Waters 2460 Variable Wavelength UV and Waters 2420 ELS detectors and Waters Millenium System data collection. This detector is typically used for concentration operating at 45° C. utilizing $N_2$ as a nebulizing gas. The columns are one 100×4.6 mm guard column and two 300×7.6 mm linear mixed bed columns with a reported molecular weight range of 100-20,000,000 (polystyrene). All columns are packed with 5 micron particle size, styrene-divinylbenzene beads and have 0.2 micron inlet frits and 0.5 micron outlet frits and manufactured by Phenomenex Spherogel Linear(2). The operating conditions are:

Solvent: chloroform.
Flow rate: 1.0 mL/min.
Injection volumes: 10 microliters.
Sample concentrations: 1.0-1.5% by weight.

All samples are filtered through 0.45 micron disposable filters to remove undissolved particulate matter. The calibrations are based upon narrow molecular weight polystyrene standards that ranged from 264 grams per mole to 2,800,000 grams per mole. To correct small flow rate changes, a drop of toluene is added to each sample and the retention time measured by UV absorbance. A retention time correction is performed for each analysis based on the retention times of the toluene.

The epoxy-containing polysiloxane oligomer composition of the invention has many applications. Accordingly, in one embodiment, the present invention is directed to a composition comprising (i) a epoxy-containing polysiloxane oligomer composition of the invention;

(ii) an organic resin containing at least one functional group selected from the group consisting of epoxy, carboxylic acid, carboxylate anion, amino, ureido, urethane, mercapto, hydroxyl, alkoxysilyl and isocyanato; and (iii) at least one additional component selected from the group consisting of a solvent, surfactant, particulate metal, pigment, biocide, filler, thixotrope, catalyst, curing agent, buffering agent and leveling agent.

Specifically, the organic resin (ii) may be an epoxy resin, an isocyanate-terminated polymer, an alkoxysilyl-terminated polyurethane, an alkoxysilyl-terminated polyether, a polyamide, a polyvinyl acetate, polyvinyl alcohol, polycarbonate, polyamines, copolymers of an alkene and (meth)acrylic, copolymers of (meth)acrylate ester and (meth)acrylic acid, terpolymers of an alkene, (meth)acrylate ester and (meth) acrylic acid, a urea-extended phenolic resin and a phenolic resin. More specifically, the organic resin (ii) is an epoxy resin selected from the group consisting of diglycidyl ether of bis-phenol A, diglycidyl ether of bis-phenol F, epoxy phenolic novolac resin, glycidyl ether of bisphenol, glycidyl ether of aliphatic polyol, glycidyl amide, glycidyl amine, thioglycidyl resins, glycidyl ester of dicarboxylic acids, tetraglycidyl ether of tetra phenol ethane, epoxy cresol novolac and combinations thereof. Commercial epoxy resins that are suitable for use in this inventions are listed in: Handbook of Epoxy Resins, Henry Lee and Kris Neville, McGraw-Hill Book Company, New York (1967), Appendix 4-2, the entire contents incorporated herein by reference.

The organic resin (ii) can in the form of an emulsion or a dispersion, in which the resin is emulsified with water using surfactants or dispersed in water. The solids content of the emulsion or dispersion may be from 0.1 to 70 weight percent, more specifically from 5 to 60 weight percent and even more specifically from 30 to 55 weight percent, based upon the total weight of the emulsion or dispersion.

The curing agent is not particularly limited and can be dicarboxylic acids, carboxylic acid anhydrides, aziridines, fatty acid polyamides, dicyandiamide, acrylamides, imidazoles, hydrazidines, ethylene imines, thioureas, sulfonamides, acrylamides, guanamines, melamine, urea, polyamines, imidazoline-polyamines, or polyamine-amides. Representative and non-liming examples include m-phenylenediamine, 4,4'methylenediamine, diaminodiphenylsulfone, benzyldimethylamine, benzyldiethylamine, dimethylethanolamine, diethylethanolamine, 2-picoline, 4-picoline, 2,6,lutidine and mixtures thereof.

Suitable solvents include water, alcohols, ketones, esters, amides, ether-alcohols, hydrocarbons, and mixtures thereof. Representative and non-limiting solvent include water, methanol, ethanol, propanol, isopropanol, butanol, ethylene glycol monomethyl ether, ethylene glycol monoethyl ether, ethylene glycol monopropyl ether, ethylene glycol monobutyl ether, ethylene glycol monohexyl ether, ethylene glycol mono-2-ethylhexyl ether, ethylene glycol monophenyl ether, diethylene glycol monomethyl ether, diethylene glycol monoethyl ether, diethylene glycol monopropyl ether, diethylene glycol monobutyl ether, butyl carbitol, dipropylene glycol dimethyl ether, butyl glycol, butyl diglycol, ethylene glycol monomethyl ether acetate, ethylene glycol monobutyl ether acetate, diethylene glycol monoethyl ether acetate, diethylene glycol monobutyl ether acetate, n-propyl acetate, n-butyl acetate, isobutyl acetate, methoxypropyl acetate, butyl cellosolve acetate, butylcarbitol acetate, propylene glycol n-butyl acetate, t-butyl acetate, propylene glycol, 2-butoxyethanol, methylethyl ketone, dimethyl ketone, ethyl acetate, ethyl propanoate, dimethylformamide, toluene, xylene, mineral spirits, naphta, and mixtures thereof. The solvent is present in the amount ranging from 0.1 to 99 weight percent, more specifically from 5 to 90 weight percent and even more specifically from 15 to 80 weight percent, based upon the total weight of the composition to which the solvent is to be added.

The surfactant can be a cationic surfactant, anionic surfactant or a non-ionic surfactant or any combination thereof. The surfactant has a hydrophilic-lipophilic balance (HLB) ranging from 5 to 13. The amount of surfactant can be in the range of from 0.1 to 6 weight percent, more specifically from 1 to 5 weight percent, based upon the total weight of the composition to which the solvent is to be added. Representative and non-limiting examples of surfactants include alkyl-phenolethoxylate surfactant, polyether siloxane based surfactant, quaternary ammonium halide surfactant, alkyl phosphate salts of ammonium, alkali or earth alkaline metal ion, organic phosphate esters, diether sulfosuccinates, or mixtures thereof.

The particulate metal can be a corrosion protection filler or a pigment. The particulate metal is any finely divided aluminum, manganese, cadmium, nickel, stainless steel, tin, magnesium, zinc, alloys thereof or ferroalloy, or salts or metal organic inhibitors or metal phosphates. More specifically, the particulate metal is zinc dust, zinc flake, aluminum dust, or aluminum in a powder or paste dispersion form. The particulate metal may be a mixture of any of the foregoing, as well as alloys and intermetallic mixtures thereof. Flake may be blended with pulverulent metal powder, but typically with only minor amounts of powder. The metallic powders typically have particle size such that all particles pass 100 mesh and a major amount passes 325 mesh ("mesh" as used herein is U.S. Standard Sieve Series). The powders are generally spherical as opposed to the leafing characteristics of the flake. Where the metal particulate is a combination of zinc with aluminum, the aluminum may be present in very amounts, ranging from 2 to 50 weight percent of the particulate metal. The particulate metal includes metal oxides, such as cerium oxide, aluminum oxide, iron oxide, silicon oxide and the like. Some particulate metal particles can be dispersed in an aqueous solvent, such as colloidal cerium oxide or colloidal silica. The particulate metal content will typically not exceed more than 70 weight percent of the total weight of the composition, based upon the total weight of the composition to which the particulate metal is to be added, but is preferably used in amounts of 1.5 to 35 weight percent. Other particulate metal also include metal salts, where representative and non-limiting examples are zinc chromates, zinc potassium chromates, zinc phosphates, aluminotriphosphates, aluminum zinc phosphates, molybdates, wolframates, zirconates and vanadates, zinc salts of 5-nitrophtalic acid or iron phoshide.

The thickener is a polymeric compound that contributes to the viscosity of the composition. A thickener may be water-soluble cellulose ether, xanthan gum, urethane associative thickeners, urethane-free nonionic associate thickeners, which are typically opaque, high-boiling liquids, or modified clays. The thickener, when present, can contribute an amount of between 0.01 and 2 weight percent, based upon the total weight of the composition to which the thickener is to be added. Representative and non-limiting thickeners include ether of hydroxyethylcellulose, methylcellulose, methylethylcellulose, highly beneficiated hectorite clay, organically modified and activated smectite clay or mixtures thereof. When thickener is used, it is usually the last ingredient added to the composition.

Fillers may include those for density modification, physical property improvements such as mechanical properties or sound absorption, fire retardancy or other benefits including those that may involve improved economics. For example, calcium carbonate or other fillers can reduce the cost of manufactured composition; aluminum trihydrate or other fire retardant fillers can improve fire retardancy; barium sulfate or other high-density filler can be used for sound absorption; microspheres of materials such as glass or polymers can improve physical properties. Fillers of high aspect ratio that are used to modify mechanical properties such as stiffness or flexural modulus include man-made fibers such as milled glass fiber or graphite fiber, natural mineral fibers such as wollastonite, natural animal fibers such as wool or plant fibers such as cotton, man-made plate-like fillers such as shattered glass and natural mineral plate-like fillers such as mica. When used, filler can be used at amount ranging from 0.1 to 80 weight percent, and more specifically from 5 to 50 weight percent, based upon the total weight of the composition to which the filler is to be added.

The composition may include surface active agents for reducing foam, aiding in de-aeration, or in modifying a surface, such as increase in mar resistance, reduced coefficient of friction, flatting or leveling effects, and improved abrasion resistance. The surface-active material may include silicone-based materials, such as a polyether silicone copolymers and silicone oils, and hydrophobized silica particles. These surface-active materials are typically used in the range of from 0.01 weight percent to 5 weight percent, based upon the total weight of the composition to which the surface-active agent is to be added. Representative and non-limiting surface active materials include CoatOSil* 100E deformer, CoatOSil* 1211 wetting agent, CoatOSil* 1220 surfactant, CoatOSil* 1221 surfactant, CoatOSil* 3500, CoatOSil* 3501, CoatOSil* 3505 or CoatOSil* 3573 agent used to reduce the coefficient of friction. CoatOSil* 3509 agent used to improve mar resistance and CoatOSil* 7001E agent, used to level and flow, all sold commercially by Momentive Performance Materials Inc.

A biocide is a chemical substance or microorganism which can deter, render harmless or exert a controlling effect on any harmful organism by chemical or biological means. A biocide can be a pesticide or an antimicrobial agent. Many biocides are synthetic, but a class of natural biocides, derived from bacteria and plants. Biocides are used at amounts ranging from 0.01 weight percent to 2 weight percent, based upon the total weight of the composition to which the surface-active agent is to be added. Representative and non-limiting examples of chemical biocides include acrolein, alphachloralose, aluminum phophide, bifenthrin, boric acid, boric oxide, brodifacoum, bromadilone, chlorophacinone, chothianidin, coumatetralyl, dazomet, dichloofluanid, difenacoum, difethialone, disodium octaborate tetrahydrate, and mixtures thereof. Representative and non-limiting examples of microorganism-based biocides include *brassica oleracea, brassica oleracea gemmifera*, and *clostridium botulinum* bacteria.

The epoxy-containing polysiloxane oligomer compositions of the present invention can be used as a component in coatings, sealants, adhesives or mineral filled composites. In use, these coatings, sealants, adhesives or mineral filled composites can be applied to a desired substrate by conventional techniques. Illustrative of substrates include plastic, metal, wood, concrete, and vitreous surfaces. Accordingly, in one embodiment, the present invention is directed to a substrate having a composition applied thereto, wherein the composition contains (i) a epoxy-containing polysiloxane oligomer composition of the invention; (ii) an organic resin containing at least one functional group selected from the group consisting of epoxy, carboxylic acid, carboxylate anion, amino, ureido, urethane, mercapto, hydroxyl, alkoxysilyl and isocyanato: and (iii) at least one additional component selected from the group consisting of a solvent, surfactant, particulate metal, pigment, biocide, filler, thixotrope, catalyst, curing agent, and leveling agent. The composition can be cured to provide desired properties to the substrate.

Advantageously, epoxy-containing polysiloxane oligomer compositions of the present invention are useful as additive for coatings to improve the chemical resistance while maintaining the flexibility of the cured coating and not contributing VOCs into the environment during use. The coatings containing the epoxy-containing polysiloxane oligomer composition of the present invention may include powder coatings, conversion coatings, passivation coatings, primers, high solids coating, waterborne coatings, solventborne coatings, e-coatings, hardcoats and the like. These coatings may be used to decorate a surface, to protect from abrasion, chemical etching or marring, to inhibit corrosion of metal surfaces, to bond different coating together or to the surface, to inhibit fouling of surfaces by biological organisms, or to improve the slip resistance of the surface.

The following examples are intended to illustrate, but in no way limit the scope of the present invention. All parts and percentages are by weight and all temperatures are in degrees Celsius unless explicitly stated otherwise.

EXAMPLES

Example 1

Preparation of Epoxy-Containing Polysiloxane Oligomer Composition 1

Two 5-liter round bottom reaction flasks equipped with a mechanical stirrer, condenser, and temperature probe were charged with silane, water and catalysts. In the first flask, 3-glycidoxypropylmethyldiethoxysilane (3262.0 grams, 13.1 moles of Silquest* A-2287, available from Momentive Performance Materials Inc.) and water containing acetic acid catalyst (1427.6 grams solution, 79.3 moles water and $2.4 \times 10^{-4}$ mole acetic acid) were charged. In the second flask, 3-glycidoxypropylmethyldiethoxysilane (3252.9 grams, 13.1 moles of Silquest* A-2287, available from Momentive Performance Materials Inc.) and water containing acetic acid catalyst (1414.3 grams, 78.6 moles water and $2.4 \times 10^{-4}$ mole acetic acid) were charged. The mixtures were stirred for a period of 96 hours at ambient temperature to effect the hydrolysis of the silane. The flasks were then equipped with a distillation head. Water and ethanol were removed from the distillation unit as an azeotrope at an initial temperature of 23-24° C. and pressure of 16.0 kilopascal to 17.3 kilopascal (120-130 mmHg) and slowly raised in temperature to remove the remaining azeotrope. The temperature was further raised to a final temperature of 60° C. and the pressure lowered to a final pressure ranging from 0.013 kilopascal to 1.2 kilopascal (0.1 to 9 mmHg) to remove the water and to condense the silanol. The contents of the two reaction vessels were then combined into one reaction vessel, and any remaining volatiles were removed at a temperature of 60° C. and a pressure of 0.26 kilopascal (2 mmHg). The reaction vessel was then sparged with nitrogen for 11 hours at 70-80° C. at 13.3 kilopascal (100 mmHg). After sparging, boric acid (1.2 grams, available from Sigma-Aldrich) was charged to the reaction vessel to provide epoxy-containing polysiloxane oligomer composition 1. The composition was analyzed to have the following properties:

Epoxy Content: 5.32 meq/gram by titration
Oligomer Distribution as determined by the LC-MS method, described herein:
component (i) 16.3 mole percent;
component (ii) 40.7 mole percent
component (iii) 31.6 mole percent;
component (iv) 11.2 mole percent;
component (v) 0.2 mole percent.
Other components included a hexamer at 2 mole percent, and a heptamer at less than <0.5 mole percent.
Viscosity: 177 centistokes, by bubble viscometer at 20° C.
Ethanoxy or Ethanol: 0 mole percent (not detected) by the 13-C NMR method, described herein.

Example 2

Preparation of Epoxy-Containing Polysiloxane Oligomer Composition 2

3-Glycidoxypropylmethyldiethoxysilane (248 grams, 1 mole) was charged into a 3-necked round bottom flask quipped with a mechanical stirrer. Aqueous boric acid solution (108 grams solution, 6 moles water and 0.054 grams boric acid, 8.75×10$^{-4}$ mole boric acid) was added to the flask and stirred at room temperature of approximately 25° C. and atmospheric pressure over a period of 16 hours. The reaction flask was then equipped with a distillation head and a vacuum pump. The mixture was heated to a temperature of 78-80° C. to remove the azeotrope of ethanol and water and then volatile byproduct water was removed with the application of vacuum over a period of 3 hours. The epoxy-containing polysiloxane oligomer composition 2 was cooled to room temperature and stored under nitrogen. The analyses of the product were:

Epoxy Content: 5.49 meq/gram by titration
Oligomer Distribution as determined by the LC-MS method, described herein:
component (i) 15.3 mole percent;
component (ii) 42.8 mole percent
component (iii) 30.5 mole percent;
component (iv) 11.2 mole percent;
component (v) 0.2 mole percent.
Other components included a hexamer at 2 mole percent, and a heptamer at less than <0.5 mole percent.
Viscosity: 125 centistokes, by bubble viscometer at 20° C.
Ethanoxy or Ethanol content: 0.5 mole percent by the 13-C NMR method, described herein.

Example 3

Preparation of Epoxy-Containing Polysiloxane Oligomer Composition 3

3-Glycidoxypropylmethyldiethoxysilane (1464.56 grams, 5.89 moles, available from Momentive Performance Materials Inc.) and aqueous acetic acid solution (655.25 grams solution, 36.4 moles water, 1.0×10$^{-4}$ mole acetic acid) were charged into a round bottom flask equipped with a mechanical stirrer, condenser, and temperature probe. The mixture was stirred for a period of 24 hours at ambient temperature to hydrolyze the silane. After equipping the flask with a distillation head, the mixture was heated to a temperature of 23° C. at 12.1 kilopascal (91 mmHg) pressure, which was slowly increased to a temperature of 30° C. at a pressure of 0.7 kilopascal (5 mmHg) to remove the ethanol and water. The reaction vessel was then sparged with nitrogen for 4.5 hours at a temperature of 90° C. and a pressure of 10.8 kilopascal (81 mmHg). 2-Methyl-1,3-propanediol (20.46 grams) was mixed with the epoxy-containing polysiloxane oligomer composition (173.57 grams).

Oligomer Distribution as determined by the LC-MS method, described herein:
component (i) 24.0 mole percent;
component (ii) 46.2 mole percent
component (iii) 18.6 mole percent;
component (iv) 3.7 mole percent;
component (v) 7.5 mole percent.
Other components included a hexamer at 0.4 mole percent.

Comparative Example A

Preparation of Comparative Epoxy-Functional Silane Oligomer Composition A

3-Glycidoxypropylmethyldiethoxysilane (36.04 grams, 0.145 moles), water (3.92 grams, 0.22 moles), and Purolite CT-275 Dry Ion Exchange Resin were charged into a round bottom flask equipped with a mechanical stirrer, condenser, and temperature probe. The reaction vessel was heated to 74° C. for 3 hours, and subsequently stripped under vacuum at a temperature of 75° C. and 0.11 kilopascal (0.85 mmHg) to provide comparative epoxy-functional silane hydrolyzate composition A. The composition was analyzed using a gas chromatographic method using an Agilent 6850 Series GC system, HP 5 capillary column, helium gas carrier, thermal conductivity detector and a temperature profile of 80° C. for 2 minutes and then a ramp up of 10° C. minute until a temperature of 250° C. is reached, followed by a 10 minute hold period. The composition contained 13.3 weight percent 3-glycidoxypropylmethyldiethoxysilane.

The epoxy-functional silane hydrolyzate composition A contained 13.3 weight percent of 3-glycidoxypropylmethyldiethoxysilane because only 1.52 moles of water were added per mole of silane in step (a). The composition A contained residual ethoxysilyl groups which, upon use, generated ethanol, a volatile organic compound that contributes to emissions into the environment. The epoxy-containing polysiloxane oligomer compositions of the present invention do not contain significant amounts of ethoxysilyl groups and therefore do not contribute to volatile organic compound emission during use.

Example 4

Stability Tests

The oligomer distribution of the products from Example 1, Example 2 and Example 3 were monitored over time. FIG. 1 is a graph of the weighted peak area average number of silicon atoms per sum of peak area of all the components of the composition, as determined using the liquid chromatography-mass spectrometry method over time. It illustrates the effect of using a stabilizing agent (d) to improve the stability of the epoxy-containing polysiloxane oligomer composition.

As shown in FIG. 1, the product from Example 1 gained 0.0063 Si units per day (0.19 Si units per month). The product from Example 2 gained 0.0148 Si units per day (0.444 Si units per month). The product from Example 3 gained 0.0017 Si units per day (0.0521 per month). The addition of the boric acid in step (d) produced a relatively more stable epoxy-containing polysiloxane oligomer composition than when boric acid was added in step (a). The 2-methyl-1,3-propanediol was also an effective stabilizing agent when used at 11.8 weight percent.

Example 5

Coating Formulations Containing the Epoxy-Containing Polysiloxane

Oligomer Composition of Example 1

Part A: Preparation of Coating Formulation Containing the Epoxy-Containing Polysiloxane Oligomer of Example 1.

A coating formulation comprising the epoxy-containing polysiloxane oligomer from Example 1, which has a releasable ethoxy/ethanol content of 0 mole percent was prepared. The epoxy-containing polysiloxane oligomer from Example 1 (22.72 grams) was added to a 250 mL wide mouth glass jar under agitation. De-ionized water (38.91 grams) was added followed by butyl cellosolve (22.99 grams). Finally, trimethylolpropane triacrylate (1.41 grams of SR 351, available through Sartomer) was added to the mixture. The mixture was vigorously agitated by hand for approximately one minute to form Part A.

Part B: Preparation of Amine Catalyst Blend

Into a 250 mL wide mouth glass jar, a 53% solids, non-ionic aqueous dispersion of a modified polyamine adduct curing agent with an amine value of 235 to 265 milligram/gram (155.16 grams of EpiKure 6870-W-53, available from Momentive Specialty Chemicals Inc.) was added. De-ionized water (9.00 grams, 0.5 mole) was added with stirring and then tris(dimethyl amino-methyl)phenol (3253, 4.50 grams of EpiKure, available from Momentive Specialty Chemicals Inc.) was added to the glass jar. The blend of materials was vigorously agitated by hand for approximately one minute. The material was then stored for use as the amine curative blend for Example 5 and Comparative Examples B and C.

The amine curative Part B (62.51 grams) was added to Part A (86.03 grams). The mixture was vigorously agitated for one minute prior to spray application.

Comparative Example B

Coating Formulation Containing CoatOSil* MP200 Epoxy Resin

A coating formulation containing a 3-glycidoxylpropyl polysilsesquioxane (CoatOSil* MP200 which has a releasable methanol, a hazardous air pollutant (HAP) content of ~20 weight percent and VOC release of ~200 g/L, available from Momentive Performance Materials Inc.) was prepared. CoatOSil* MP200 (24.33 grams) was added to the jar with agitation. De-ionized water (38.70 grams) was added followed by butyl cellosolve (23.10 grams). Finally, trimethylolpropane triacrylate (1.41 grams of SR 351, available from Sartomer) was added to the mixture, to form Part A. The amine curative prepared in Example 5 (59.54 grams of Part B) was added to Part A (86.13 grams). The mixture was vigorously agitated for one minute prior to spray application.

Comparative Example C

Coating Formulation Absent of Epoxy-Containing Polysiloxane Oligomer of Present Invention A coating formulation was prepared by adding de-ionized water (38.90 grams), butyl cellosolve (22.98 grams), trimethylolpropane triacrylate (1.41 grams of SR351, available through Sartomer) and finally, a 53 weight percent solids, non-ionic aqueous dispersion of a modified EPON™ Resin 1001 type solid Bis A epoxy (68.40 grams of Epirez 6520-WH-53, available from Momentive Specialty Chemicals Inc.) to a 250 mL glass jar. The mixture was then vigorously agitated by hand for approximately one minute to give Part A. To this mixture, the amine curative prepared above in Example 5 (38.28 grams of Part B) was added to Part A (131.69 grams) and vigorously agitated for one minute prior to spray application.

Example 6 and Comparative Examples D and E

Testing of the Coating Formulations from Example 5 and Comparative Examples B and C The substrate that was used to test the coating compositions was Cold Roll Steel APR10184 substrate available from ACT Test Panels.

The solution to clean the Cold Roll Steel consisted of 0.06 weight percent Triton X-100, 0.52 weight percent anhydrous sodium metasilicate, 0.49 weight percent anhydrous sodium carbonate, 0.35 weight percent sodium phosphate, anhydrous dibasic, all available from Aldrich, and 98.57 weight percent de-ionized water.

The Cold Roll Steel panels were cleaned. The cleaning solution was heated to a temperature of between 65° C. to 70° C. The Cold Roll Steel panels were immersed into the stirred, heated cleaning solution for 2 to 3 minutes to remove any oil contaminants. The panels were removed from the solution and immediately rinsed with de-ionized water. Kimwipe Kimtech Delicate Task Wipers, available from Kimberly Clark, were then used to wipe the panels dry. The panels were then lightly sprayed with water to determine the water break of the cleaned panels, in according to ASTM F-22, "Standard Method of Test for Hydrophobic Surface Films by the Water Break Test. If the panels showed water beading, then the cleaning process was repeated. If the water formed a continuous sheen, then the panels were then dried with a Kimwipe wiper and stored for use.

The coating formulations from Example 5 and Comparative Examples B and C were then spray applied over the bare Cold Roll Steel panels. Spray application was conducted with a StartingLine HVLP gravity fed siphon spray hand spraygun, available through DeVilbiss. The coatings were sprayed at a wall pressure of 241.3 kilopascal (35 lb/in$^2$). The spray application technique was a side-to-side sweep of the spray onto the panel at a rate of approximately 2,540 centimeter/minute (1,000 inches/minute), indexing up and down the panel approximately 5.0 centimeters (2 inches) per sweep until approximately 25.4 microns (1.0 mil) of coating thickness was applied on the panel.

The panels were then cured under room temperature conditions for 24 hours, and then tested for scrub resistance using methyl ethyl ketone (MEK) Double Rubs according to AATCC 8 using Crockmeter device and 4 layers of cheesecloth, for gloss according to ASTM D523, for Pencil Hardness according to ASTM D3363, and for Gardner Direct & Reverse Impact Strength according to ASTM D2794 using a 4-pound weight. Test results were measured at 1, 3, and 10 days unless otherwise specified.

Figure 2:
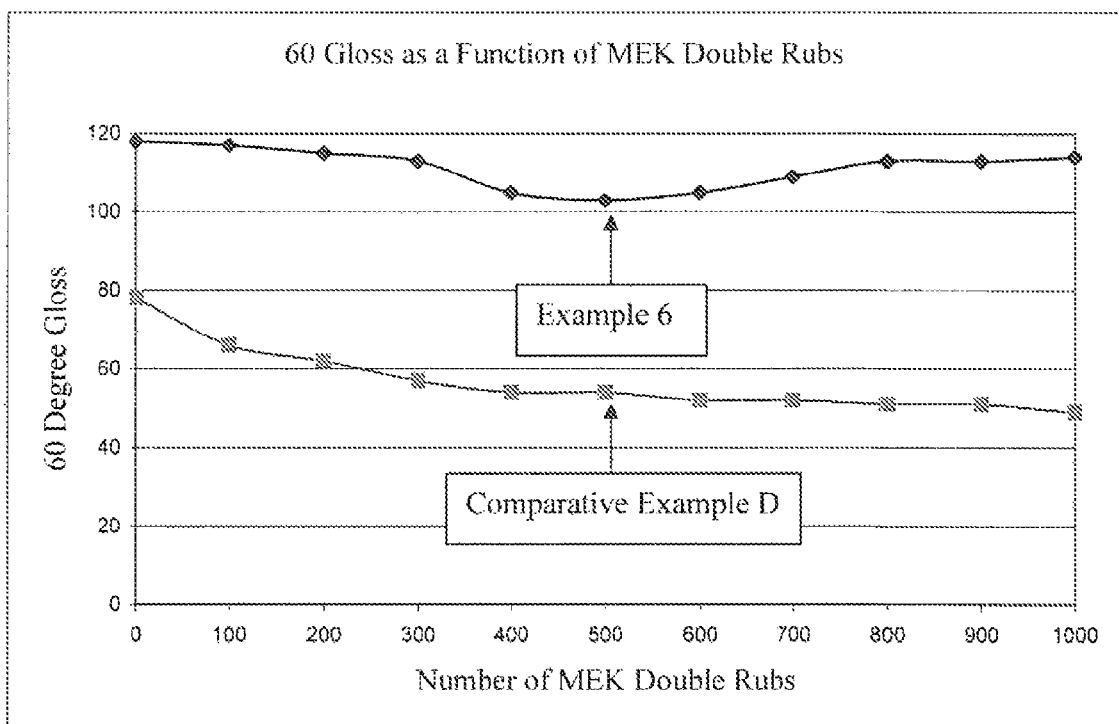
FIG. 2 illustrates 60 degree gloss as a function of MEK double rubs after three day post cure at room temperature for Example 6 and Comparative Example D.
Figure 3:
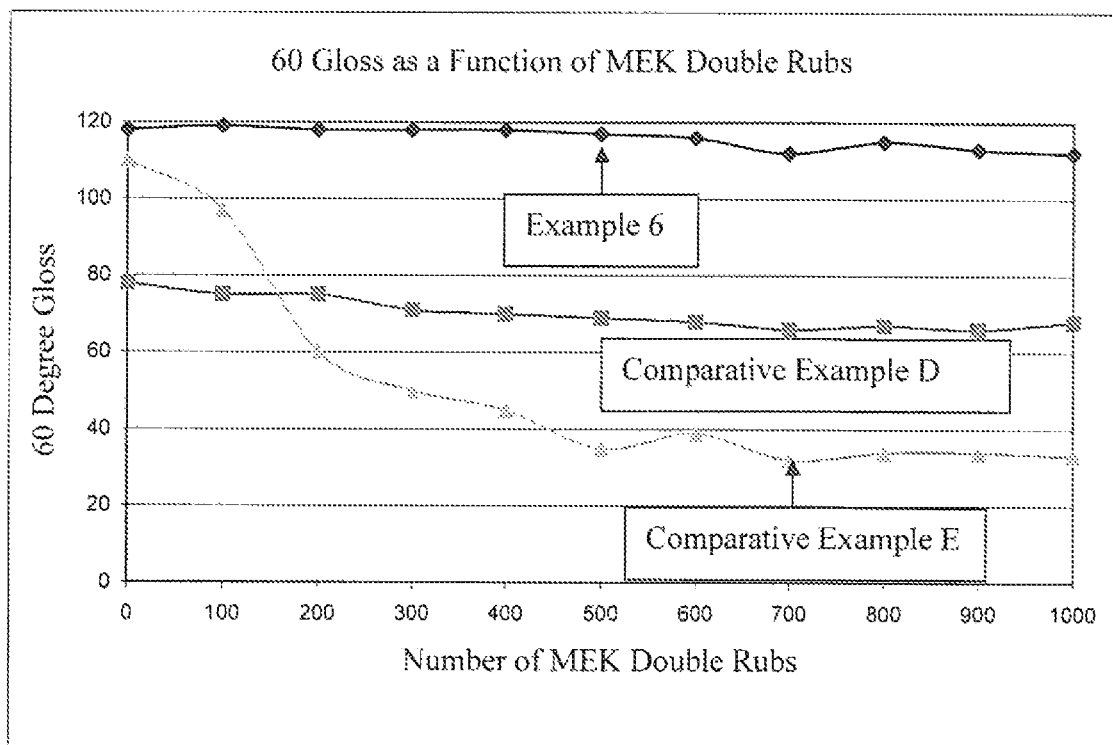
FIG. 3 illustrates 60 degree gloss as a function of MEK double rubs after a ten-day post cure at room temperature for Example 6 and Comparative Examples D and E.

The test Results are shown in Tables 1-3 and FIGS. 2 and 3.

TABLE 1

MEK Double Rubs results are presented. The MEK double rubs are reported as the number of double rubs until the metal is exposed or until 999+ scrubs were completed.

| Example | Coating prepared in Example | Day 1 | Day 3 | Day 10 | Day 40 |
|---|---|---|---|---|---|
| 6 | 5 | 999+ | 999+ | 999+ | — |
| D | B | 999+ | 999+ | 999+ | — |
| E | C | 21 | — | — | ~800 |

TABLE 2

Results from Pencil Hardness testing of coating compositions

| Example | Coating from Example | Day 1 | Day 3 | Day 10 | Day 40 |
|---|---|---|---|---|---|
| Example 6 | Example 5 | — | 4H | 5H | — |
| Comparative Example D | Comparative Example B | — | 4H-5H | 4H-5H | — |
| Comparative Example E | Comparative Example C | — | — | — | 3H |

TABLE 3

Results from impart resistance testing of coating compositions.

| Example | Coating from Example | Day 1 | Day 3 | Day 10 | Day 40 |
|---|---|---|---|---|---|
| DIRECT IMPACT | | | | | |
| Example 6 | Example 5 | 160 | 120 | 80-100 | — |
| Comparative Example D | Comparative Example B | 140 | 60 | 40 | — |
| Comparative Example E | Comparative Example C | — | — | — | 160 |
| REVERSE IMPACT | | | | | |
| Example 6 | Example 5 | 160 | 160 | 160 | — |
| Comparative Example D | Comparative Example B | 140 | 60 | <20 | — |
| Comparative Example E | Comparative Example C | — | — | — | 160 |

The results of the testing indicate that the coating composition of Example 5 had MEK double rubs in excess of 999, indicating chemical resistance, and reverse impact of 160, indicating flexibility. The coating of Comparative Example B had MEK double rubs in excess of 999, but the reverse impact was less than 20 after 10 days, indicating poorer flexibility than the coating of Example 5. Likewise, the coating of Comparative Example C had MEK rubs of only 21 after 1 day, which slowly increased to 800 double rubs after 40 days, indicating poorer chemical resistance than the coating of Example 5, even though its flexibility, as indicated by the reverse impact, was comparable. Only the coating composition containing the epoxy-containing polysiloxane oligomer composition of the present invention had good chemical resistance without sacrificing flexibility.

Comparative Example F

Coating Formulations Containing 3-Glycidoxypropylmethyldiethoxysilane

A two-part coating formula was prepared using 3-glycioxypropylmethyldiethoxysilane, the precursor silane used to make the epoxy-containing polysiloxane oligomer composition.

Part A: Preparation of Coating Formulation Containing the

3-Glycidoxypropylmethyldiethoxysilane

A coating formulation containing 3-glycidoxypropylmethyldiethoxysilane was prepared. A medium viscosity hydrogenated epoxy-4,4'-isopropylidenediphenol resin (28.5 grams of Eponex 1510 resin, available from Momentive Specialty Chemicals Inc.), micronized rutile titanium dioxide (25 grams of Bayertitan R-KB-4, available from Bayer AG), a methoxy functional methylphenyl polysiloxane (14.6 grams of TSR-165, available from Momentive Performance Materials Inc.) and 3-glycidoxypropylmethyldiethoxysilane (9.5 grams of Silquest* A-2287, available from Momentive Performance Materials Inc.) was added to a 250 mL wide mouth glass jar under agitation. The mixture was vigorously agitated by hand for approximately one minute to form Part A.

Part B: Preparation of Amine Curative Mixture

Into a 250 mL wide mouth glass jar were charged a medium viscosity reactive polyamide curing agent, based on dimerized fatty acid and poly-amines with an amine content of 330 to 360 milligram/gram (3125, 9.2 grams of Epikure curing agent, available from Momentive Specialty Chemicals Inc.), 3-aminopropyltriethoxysilane (11.2 grams of Silquest* A-1100 silane, available from Momentive Performance Materials Inc.) and dibutyl tin dilaurate (2 grams of Fomrez tin catalyst SUL-4, available from Momentive Performance Materials Inc.). The blend of materials was vigorously agitated by hand for approximately one minute.

Part A and Part B were mixed and vigorously agitated for one minute prior to spray application.

Example 7

Coating Formulation Containing Epoxy-Containing Polysiloxane Oligomer Prepared in Example 2

Part A: Preparation of Coating Formulation Containing the Epoxy-Containing Polysiloxane Oligomer Prepared in Example 2

A coating formulation containing epoxy-containing polysiloxane oligomer of Example 2 was prepared. A medium viscosity hydrogenated epoxy-4,4'-isopropylidenediphenol resin (27.8 grams of Eponex 1510 resin, available from Momentive Specialty Chemicals Inc.), micronized rutile titanium dioxide (25 grams of Bayertitan R-KB-4, available from Bayer AG), a methoxy functional methylphenyl polysiloxane (14.6 grams of TSR-165, available from Momentive Performance Materials Inc.) and epoxy-containing polysiloxane oligomer composition prepared in Example 2 (9.3 grams) was added to a 250 mL wide mouth glass jar under agitation.

The mixture was vigorously agitated by hand for approximately one minute to form Part A.

Part B: Preparation of Amine Curative Mixture

Into a 250 mL wide mouth glass jar were charged a medium viscosity reactive polyamide curing agent, based on dimerized fatty acid and poly-amines with an amine content of 330 to 360 milligram/gram (3125, 9.6 grams of Epikure curing agent, available from Momentive Specialty Chemicals Inc.), 3-aminopropyltriethoxysilane (11.7 grams of Silquest* A-1100 silane, available from Momentive Performance Materials Inc.) and dibutyltin dilaurate (2 grams of Fomrez tin catalyst SUL-4, available from Momentive Performance Materials Inc.). The blend of materials was vigorously agitated by hand for approximately one minute.

Part A and Part B were mixed and vigorously agitated for one minute prior to spray application.

Example 8 and Comparative Example G

Testing of the Coating Formulations from Example 7 and Comparative Example F

The substrate that was used to test the coating compositions was Cold Roll Steel APR10184 substrate available from ACT Test Panels.

The solution to clean the Cold Roll Steel consisted of 0.06 weight percent Triton X-100, 0.52 weight percent anhydrous sodium metasilicate, 0.49 weight percent anhydrous sodium carbonate, 0.35 weight percent sodium phosphate, anhydrous dibasic, all available from Aldrich, and 98.57 weight percent de-ionized water.

The Cold Roll Steel panels were cleaned. The cleaning solution was heated to a temperature of between 65° C. to 70° C. The Cold Roll Steel panels were immersed into the stirred, heated cleaning for 2 to 3 minutes to remove any oil contaminants. The panels were removed from the solution and immediately rinsed with de-ionized water. Kimwipe Kimtech Delicate Task Wipers, available from Kimberly Clark, were then used to wipe the panels dry. The panels were then lightly sprayed with water to determine the water break of the cleaned panels. If the panels showed water beading, then the cleaning process was repeated. If the water formed a continuous sheen, then the panels were then dried with a Kimwipe wiper and stored for use.

The coating formulations from Example 7 and Comparative Examples F were then spray applied over the bare Cold Roll Steel panels to form test panels for Example 8 and Comparative Example G, respectively. Spray application was conducted with a StartingLine HVLP gravity fed siphon spray hand spraygun, available through DeVilbiss. The coatings were sprayed at a wall pressure of 241.3 kilopascal (35 lb/in$^2$). The spray application technique was a side-to-side sweep of the spray onto the panel at a rate of approximately 2,540 centimeter/minute (1,000 inches/minute), indexing up and down the panel approximately 5.0 centimeters (2 inches) per sweep until approximately 25.4 microns (1.0 mil) of coating thickness was applied on the panel.

The panels were then cured under room temperature conditions for 24 hours, and then tested for scrub resistance using methyl ethyl ketone (MEK) Double Rubs according to AATCC 8 using Crockmeter device and 4 layers of cheesecloth, and for gloss according to ASTM D523. The gloss retention was measure before and after 200 MEK double rubs. The results of the testing are reported in Table 4.

TABLE 4

Gloss retentions for coating formulations the test results for

| Example | Coating from Example | Initial gloss @ 60° | Gloss @ 60° after 200 double-hubs with MEK | Gloss retention |
|---|---|---|---|---|
| Example G | Example F | 82° | 65° | 79% |
| Example 8 | Example 7 | 89° | 85° | 96% |

The coating composition containing epoxy-containing polysiloxane oligomer composition from Example 2 had initial gloss and gloss retention better than the similar coating composition containing the monomeric silane, 3-glycidoxypropylmethyldiethoxysilane. The gloss retention of 96% for the coating of Example 7 indicates better chemical resistance than observed for Comparative Example G, which had only 79% gloss retention.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein, and it is intended that the invention embrace all such adaptations and modifications that fall within the spirit and broad scope of the appended claims. It is to be further understood that the phraseology or terminology herein is for the purpose of description and not of limitation, such that the terminology or phraseology of the present specification is to be interpreted by the skilled artisan in light of the teachings and guidance.

What is claimed is:

1. A process for making an epoxy-containing polysiloxane oligomer composition wherein the composition comprises,
   (i) from 5 to 65 mole percent of a polysiloxane of the Formula (I):

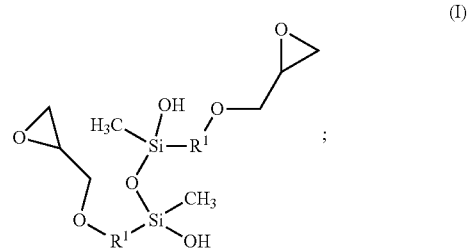

(ii) from 10 to 55 mole percent of a polysiloxane of the Formula (II):

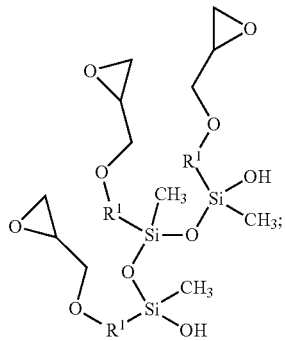

(iii) from 5 to 45 mole percent of a polysiloxane of the Formula (III):

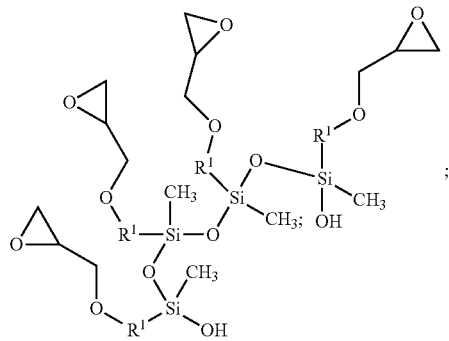

(iv) from 1 to 20 mole percent of a polysiloxane of the Formula (IV):

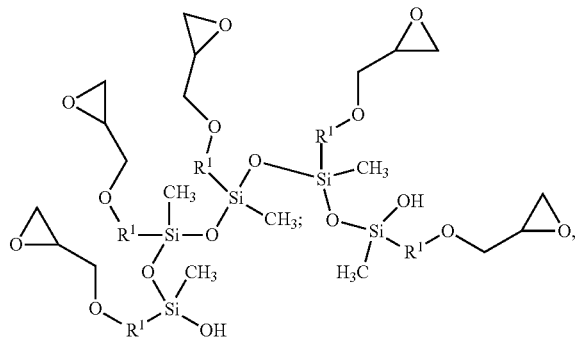

and
(v) from 0.1 to 20 mole percent of a polysiloxane of the Formula (V):

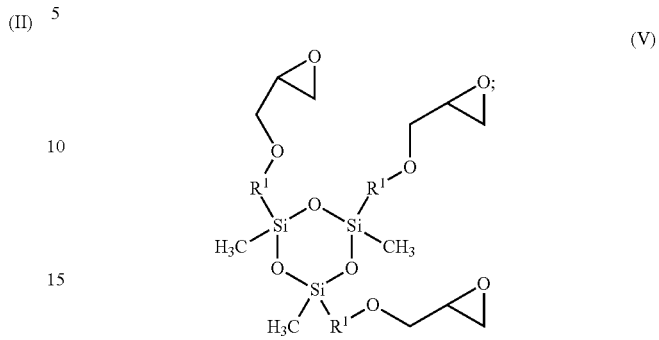

wherein each occurrence of $R^1$ is —$CH_2CH_2CH_2$— and the mole percent of components (i), (ii), (iii), (iv) and (v) are based upon the sum of the molar amounts of components (i), (ii), (iii), (iv) and (v),
and wherein the process comprises:
(a) hydrolyzing a silane of the general Formula (VI)

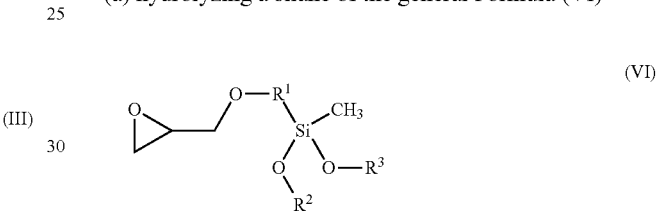

wherein:
$R^1$ is —$CH_2CH_2CH_2$—;
$R^2$ is a monovalent alkyl group of from 1 to 3 carbon atoms; and
$R^3$ is a monovalent alkyl group of from 1 to 3 carbon atoms;
in the presence of 2 to 15 moles of water per mole of the silane and, optionally, a hydrolysis catalyst, at a temperature of from 10° to 100° C. to provide an intermediate containing a silanol and an alcohol;
(b) removing the alcohol by distillation;
(c) removing water to condense the silanol to the desired polysiloxane oligomer composition comprising from 5 to 65 mole percent of the polysiloxane of the Formula (I), from 10 to 55 mole percent of the polysiloxane of the Formula (II), from 5 to 45 mole percent of the polysiloxane of the Formula (III), from 1 to 20 mole percent of the polysiloxane of the Formula (IV), and from 0.1 to 20 mole percent of the polysiloxane of the Formula (V), wherein the Formulae (I), (II), (III), (IV) and (V) are as defined above, wherein the mole percents of components (i), (ii), (iii), (iv) and (v) are based upon the sum of the molar amounts of components (i), (ii), (iii), (iv) and (v); and optionally
(d) adding a stabilizing agent,
thereby making the epoxy-containing polysiloxane oligomer composition.

2. The process of claim 1, wherein the step (b) is carried out under a pressure of from 0.1 kilopascal to 200 kilopascal.

3. The process of claim 1, wherein the step (c) is carried out under a pressure of from 0.1 kilopascal to 200 kilopascal.

4. The process of claim 1, wherein the stabilizing agent has the Formula (VII):

$$R^4(OR^5)_p \qquad \text{(VII)}$$

wherein:

$R^4$ is a boron atom, a HP(=O)(—)$_2$ group, a P(=O)(—)$_3$ group, a $R^6$C(=O)(—) group, a polyvalent hydrocarbon group containing from 3 to 20 carbon atoms or a polyvalent heterocarbon group containing from 3 to 20 carbon atoms;

each $R^5$ is independently a hydrogen, a $R^6$C(=O)(—) group, or a hydrocarbon containing from 1 to 6 carbon atoms;

each $R^6$ is independently a monovalent hydrocarbon containing from 1 to 5 carbon atoms; and p is an integer of from 1 to 6.

5. The process of claim 4, wherein the stabilizing agent is selected from the group consisting of boric acid, phosphoric acid, phosphorus acid, acetic acid, acetic acid anhydride, glycerol, 2-methyl-1,3-propanediol, 1-methoxy-2,3-propanediol, 1,2-hexanediol, and 2,3-dimethyl-2,3-butanediol.

6. The process of claim 1, further comprising carrying out the reaction of step (a) in the presence of a catalyst.

7. The process of claim 6, wherein the catalyst is selected from the group consisting of metal salts, carboxylic acids, mineral acids or metal chelates.

8. A composition comprising:

(A) an epoxy-containing polysiloxane oligomer composition which comprises:

(i) from 5 to 65 mole percent of a polysiloxane of the Formula (I):

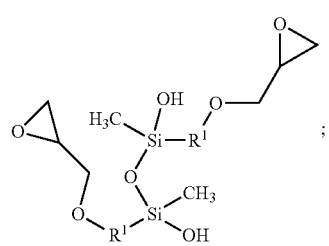

(II)

(ii) from 10 to 55 mole percent of a polysiloxane of the Formula (II):

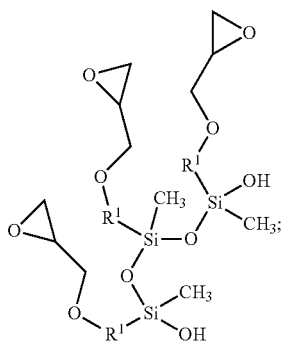

(iii) from 5 to 45 mole percent of a polysiloxane of the Formula (III):

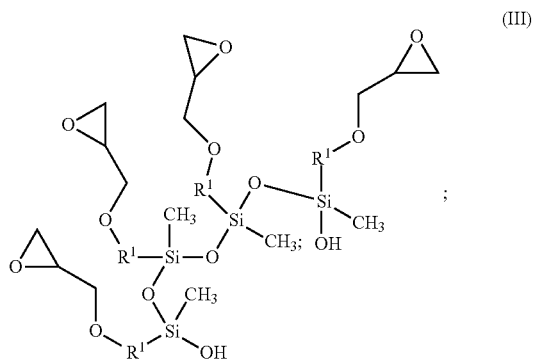

(iv) from 1 to 20 mole percent of a polysiloxane of the Formula (IV):

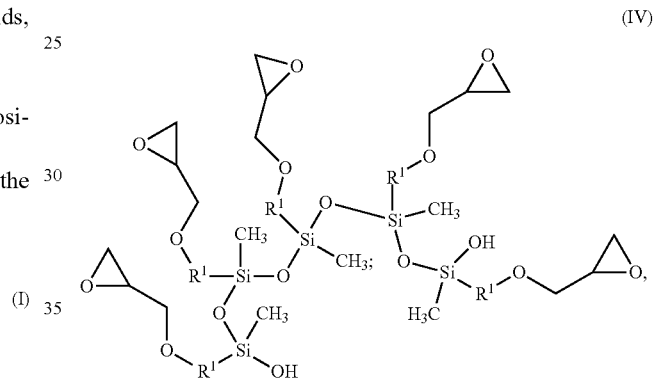

and (v) from 0.1 to 20 mole percent of a polysiloxane of the Formula (V):

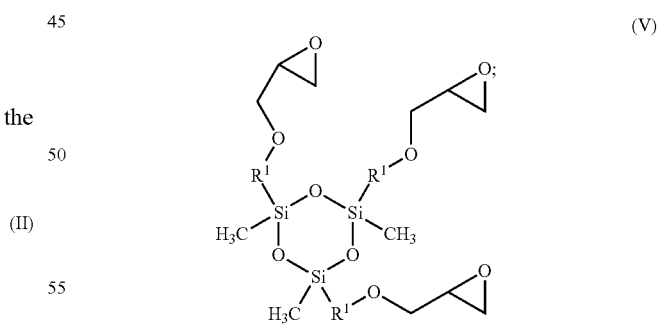

wherein each occurrence of $R^1$ is —CH$_2$CH$_2$CH$_2$— and the mole percent of components (i), (ii), (iii), (iv) and (v) are based upon the sum of the molar amounts of components (i), (ii), (iii), (iv) and (v);

(B) an organic resin containing at least one functional group selected from the group consisting of epoxy, carboxylic acid, carboxylate anion, amino, ureido, urethane, mercapto, hydroxyl, alkoxysilyl and isocyanato; and, (C) at least one additional component selected from the group consisting of a solvent, surfactant, particulate metal, pigment, biocide, filler, thixotrope, catalyst, curing agent, and leveling agent.

9. The composition of claim 8, wherein the organic resin (B) is an epoxy resin, an isocyanate-terminated polymer, an alkoxysilyl-terminated polyurethane, an alkoxysilyl-terminated polyether, a polyamide, a polyvinyl acetate, a polyvinyl alcohol, a polycarbonate, a polyamine, a copolymer of an alkene and (meth)acrylic, a copolymer of (meth)acrylate ester and (meth)acrylic acid, a terpolymer of an alkene, (meth)acrylate ester and (meth)acrylic acid, a urea-extended phenolic resin, a phenolic resin, or combination thereof.

10. The composition of claim 8, wherein the organic resin (B) is an emulsion or a dispersion.

11. The composition of claim 8, wherein the organic resin (B) is an epoxy resin selected from the group consisting of diglycidyl ether of bis-phenol A, diglycidyl ether of bisphenol F, epoxy phenolic novolac resin, glycidyl ether of bisphenol, glycidyl ether of aliphatic polyol, glycidyl amide, glycidyl amine, thioglycidyl resins, glycidyl ester of dicarboxylic acids, tetraglycidyl ether of tetra phenol ethane, epoxy cresol novolac, and combinations thereof.

12. The composition of claim 8, wherein the curing agent is selected from group consisting of dicarboxylic acids, carboxylic acid anhydrides, aziridines, fatty acid polyamides, dicyandiamide, acrylamides, imidazoles, hydrazidines, ethylene imines, thioureas, sulfonamides, acrylamides, guanamines, melamine, urea, polyamines, imidazoline-polyamines, and polyamine-amides.

13. The composition of claim 8, wherein the solvent is selected from the group consisting of water, alcohols, ketones, esters, amides, ether-alcohols, and mixtures thereof.

14. The composition of claim 8, wherein the composition is a coating, a sealant, an adhesive or a composite.

15. The composition of claim 14, wherein the coating is selected from the group consisting of powder coatings, conversion coatings, passivation coatings, primers, high solids coatings, waterborne coatings, solventborne coatings, e-coatings and hardcoats.

16. The composition of claim 15, wherein the coating is selected from the group consisting of conversion coatings and passivation coatings.

17. A substrate having the composition of claim 8 applied thereto.

18. The substrate of claim 17 wherein the composition is cured.

* * * * *